United States Patent [19]
Void

[11] 3,777,265
[45] Dec. 4, 1973

[54] INDUCTION AMMETER WITH SELF INDUCED RESTORING TORQUE

[75] Inventor: Lester R. Void, Perkasie, Pa.

[73] Assignee: Electro-Mechanical Instrument Div., VLN Corp., Perkasie, Pa.

[22] Filed: Jan. 19, 1973

[21] Appl. No.: 325,069

[52] U.S. Cl. .............................. 324/146, 324/151 R
[51] Int. Cl. ............................ G01r 1/20, G01r 1/16
[58] Field of Search .................... 324/146, 147, 154, 324/151

[56] References Cited
UNITED STATES PATENTS
1,463,597  7/1923  Scott et al ........................... 324/146

*Primary Examiner*—Alfred E. Smith
*Attorney*—Richard E. Kurtz

[57] ABSTRACT

In a moving magnet meter a dial blank of soft magnetic material has tabs which are aligned with the poles of the moving magnet to establish the zero setting of the pointer. The pointer is rotationally deflected over the dial by the magnetic field which is established transverse to the line of the tabs by current flowing through a conductor carrying current to be measured. With no current in the conductor the magnetic axis of the magnet aligns itself with the induced pole arms in the tabs as a path of minimum reluctance. The tabs can be easily adjusted to control the sensitivity of the meter and the magnitude of the restoring torque.

8 Claims, 3 Drawing Figures

PATENTED DEC 4 1973 3,777,265

INDUCTION AMMETER WITH SELF INDUCED RESTORING TORQUE

BACKGROUND OF THE INVENTION

This invention relates to electric meters and more particularly to a meter having a soft magnetic dial blank with tabs which act as self induced pole pieces to establish the restoring torque for the meter.

Moving permanent magnetic electric meters have been extensively used in industry. One example is the meter shown in U.S. Pat. No. 3,200,332 - Pfeffer. Such a magnet includes a rotating arbor with a pointer and a permanent magnet mounted thereon. A control magnet applies a restoring torque to the pointer carrying arbor.

In induction type ammeters, the current through a conductor establishes a magnetic field which acts directly on the moving magnet to deflect the pointer to a position indicating the magnitude of the current. FIGS. 5-9 of U.S. Pat. No. 3,013,210 - Wargo show an induction ammeter. In the Wargo meter, four pole pieces are used to concentrate the magnetic flux of the current to establish a torque. The restoring torque on the moving magnet is established by two projections 15 and 16 which act as zeroing poles.

SUMMARY OF THE INVENTION

In accordance with this invention the dial blank of a moving magnet meter is constructed of a soft magnetic material and has tabs which act as self induced pole pieces to apply a restoring torque to the moving magnet. The pole pieces are adjustable to control the self induced restoring torque and sensitivity of the meter.

The dial blank of soft magnetic material provides the following functions in one integral part: (1) It provides a base for the legendary indicia; (2) It provides a means for adjusting the zero or "no current" position of the movement; (3) It provides restoring torque to the movement; (4) It provides a means of adjusting the sensitivity of the instrument to the proper values of applied current to the conductor.

In accordance with another aspect of the invention the meter is an induction ammeter wherein a conductor carrying current to be measured is coupled to the meter by an interruped channel with projections which form a serpentine opening in the channel. The wire is inserted into the opening to secure it to the meter without threading the conductor through a hook.

In accordance with another aspect of the invention the meter has a molded resilient plastic case having a lip which engages one side of a mounting panel. A mounting screw is threaded through a canted screw hole to engage the other side of the mounting panel to securely fasten the meter to the panel.

In accordance with another aspect of the invention a clear plastic bezel has a frosted portion which hides the meter movement. The bezel can be snapped into the molded plastic case.

The foregoing and other objects, features and advantages of the invention will be better understood from the following more detailed description, appended claims and drawings.

DESCRIPTION OF A PARTICULAR EMBODIMENT

Figure 1:
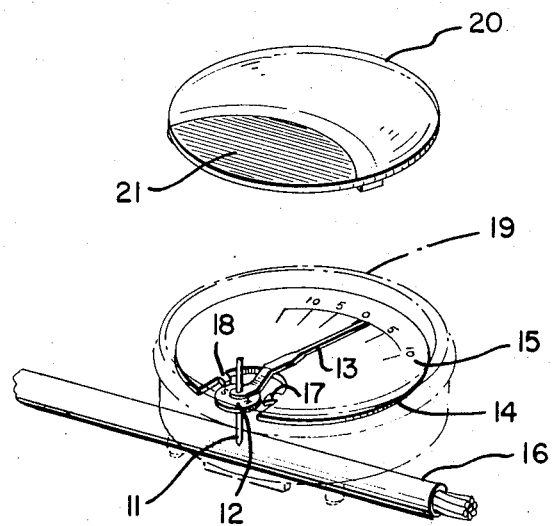
FIG. 1 is an exploded view of the meter.
Figure 2:
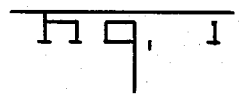
FIG. 2 is a side view of the meter.

The induction ammeter of this invention includes a pivoted arbor 11 upon which a permanent magnet disc 12 is mounted. A pointer 13, or other suitable indicating means is also mounted on the arbor.

The dial blank 14 is constructed of soft magnetic material. The dial blank has indicia 15 imprinted thereon and the dial blank is mounted with respect to the pointer 13 so that the pointer registers the magnitude of current through the conductor 16.

The dial blank has adjustable tabs 17 and 18 which extend into the proximity of the poles of the permanent magnet 12. With no current in the conductor 16, the magnetic axis of the permanent magnet 12 aligns itself with the induced pole arms established by the tabs 17 and 18. The tabs 17 and 18 provide a path of minimum magnetic reluctance.

Current in the conductor 16 establishes a magnetic field which is transverse to the conductor 16. This magnetic field deflects the axis of the magnet 12 tending to line the axis up with the field. The rotational deflection of the magnetic is a measure of the current strength and the direction of the current flow.

The meter has a case 19 which is molded of resilient plastic. Polypropylene plastic is particularly suitable for use. A clear platic bezel 20 can be snapped into the polypropylene plastic case. The characteristics of this type of plastic are particularly suitable for this arrangement because the plastic is resilient enough to allow the bezel be snapped in and yet it is stiff enough to hold the bezel firmly in place over the meter. The lower portion of the bezel is serrated and frosted in the area 21. This frosted and serrated area hides the meter movement.

A flange 22 on the case engages one side of a mounting panel 22. A mounting screw 24 is threaded through a canted hole in the case to engage the other side of mounting panel 23. This secures the meter to the mounting panel. The molded resilient plastic case is particularly advantageous for this arrangement. When other materials are used in an arrangement such as this, the thread in the hole quickly becomes stripped if the screw is tightened. However, with a resilient plastic such as ploypropylene, the threads merely slip, they are not stripped, if too many turns are taken in the screw.

The canted screw hole is advantageously molded into the case at the time that the molded case is formed. The screw hole can be formed by two cores of the die. One core is on one side of the die and the other core is on the other side of the die and the two cores intersect at a right angle in the case. Once core must be removed before the dies are separated but the other core will pull out when the dies are separated. Indentations on the end of one of the cores will leave small projections in the hole which serve as screw threads.

Figure 3:
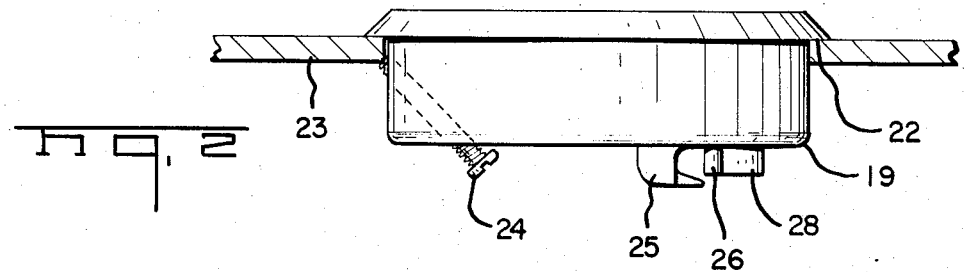
FIG. 3 is a view of the back of the meter.
Figure 3:
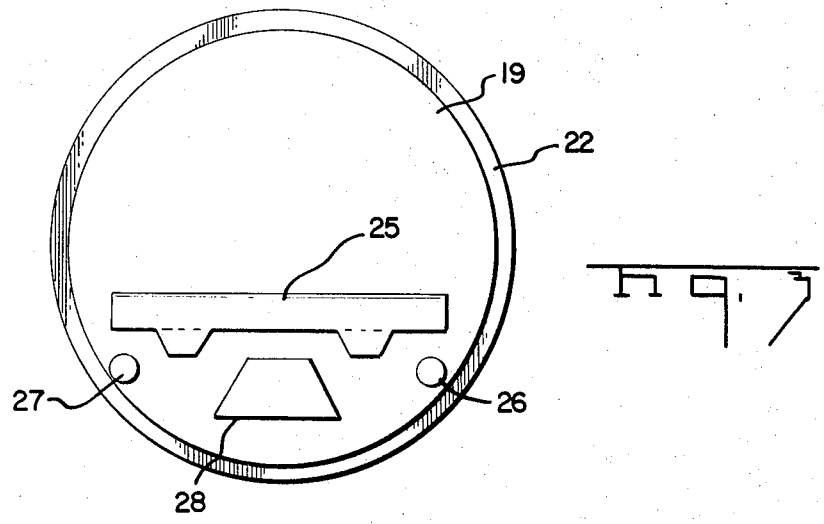

FIG. 3 shows the back of the meter and the arrangement for securing the conductor 16 to the meter case. An interruped channel 25 is moled into the meter case. Projections 26, 27 and 28 are positioned opposite the interruptions in the channel. The openings into the channel is serpentine. The conductor can be inserted into this serpentine opening and the channel with the projections securely clamps the conductor to the back of the case. This is an advantage over an arrangement such as that shown in FIG. 9 of the afrementioned Wargo patent wherein the conductor must be threaded through the hooking clamp.

While a particular embodiment of the invention has been shown and described, various modifications may be made without departing from the true spirit and scope of the invention. The appended claims are, therefore, intended to cover any such modifications.

What is claimed:

1. An electric meter comprising:
   a rotatably mounted arbor,
   a permanent magnet mounted on said arbor,
   indicating means mounted on said arbor,
   a dial blank of soft magnetic material positioned in relation to said indicator so that rotation of said indicator registers the magnitude of an electrical quantity with respect to indicia on said dial blank,
   tabs extending from said dial blank into proximity with the two poles of said permanent magnet so that the two poles of said permanent magnet are aligned with said two tabs at the unenergized setting of said indicator with respect to said indicia, and
   means for establishing a magnetic field approximately transverse to the line of said tabs to rotationally deflect the magnet as a measure of the electrical quantity inducing the magnetic field.

2. The electric meter recited in claim 1 wherein said meter is an induction ammeter and wherein a conductor carrying current to be measured is coupled in a line which is substantially parallel to the line of said tabs to establish said magnetic field having a magntidue related to the current through said conductor and whereby the magnetic axis of said permanent magnet aligns itself with said tabs as a path of minimum reluctance when there is no current in said cable.

3. The meter recited in claim 2 further comprising:
   an interrupted channel on the back of said meter, projection on the back of said meter to form a serpentine opening in said channel so that said conductor can be inserted in said opening to secure the conductor to the meter without threading the conductor through the hook.

4. The meter recited in claim 1 wherein said tabs are adjustable with respect to said permanent magnet to control the restoring torque applied to said permanent magnet, to control the sensitivity of said meter, and to control the unenergized position of said indicating means.

5. The meter recited in claim 1 further comprising:
   a molded resilient plastic case for said meter having a flange thereon for engagement with one side of a mounting panel, and
   a canted screw hole positioned in said case so that a mounting screw can engage the other side of said mounting panel.

6. The meter recited in claim 5 wherein said canted screw hole is formed by two cores of a die, said cores meeting at a right angle in said case.

7. The meter recited in claim 5 further comprising:
   a clear plastic bezel, said plastic case having a groove around the periphery thereof, said clear platic bezel being snapped into said groove.

8. The meter recited in claim 7 wherein said clear plastic bezel has a serrated and frosted area at one side thereof to hide the meter movement.

* * * * *

UNITED STATES PATENT OFFICE
CERTIFICATE OF CORRECTION

Patent No. 3,777,265      Dated December 4, 1973

Inventor(s) Lester R. Void

It is certified that error appears in the above-identified patent and that said Letters Patent are hereby corrected as shown below:

Column 2, line 36, "panel 22" should be --panel 23--;

line 58, "moled" should be --molded--;

line 60, "openings" should be --opening--.

Signed and sealed this 16th day of April 1974.

(SEAL)
Attest:

EDWARD M. FLETCHER, JR.
Attesting Officer

C. MARSHALL DANN
Commissioner of Patents